United States Patent

[11] 3,569,711

| [72] | Inventors | Richard K. Stoms<br>Fort Thomas, Ky.;<br>Edward Kuerze, Cincinnati, Ohio |
|---|---|---|
| [21] | Appl. No. | 736,146 |
| [22] | Filed | June 11, 1968 |
| [45] | Patented | Mar. 9, 1971 |
| [73] | Assignee | the United States of America as represented by the Secretary of the Department of Health, Education and Welfare |

[54] METHOD AND APPARATUS FOR MEASURING RADIATION WITH A PLURALITY OF DETECTORS AND DETERMINING SOURCE OF HIGHEST RADIATION EMANATING FROM A SURFACE AREA SUCH AS THE SCREEN OF A COLOR TELEVISION SET
11 Claims, 3 Drawing Figs.

[52] U.S. Cl. ................................................ 250/83.6, 250/83.3, 315/210
[51] Int. Cl. ................................................ G01t 1/18
[50] Field of Search .......................................... 250/83.6; 315/210, 211; 250/83.3, 71.5

[56] References Cited
UNITED STATES PATENTS

| 3,234,386 | 2/1966 | Leventhal et al. | 250/83.6X |
| 3,244,881 | 4/1966 | Hansen et al. | 250/83.3 |
| 3,400,267 | 9/1968 | Tolmie | 250/83.6X |
| 3,428,901 | 2/1969 | Blackett | 250/83.6X |

*Primary Examiner*—Archie R. Brochelt
*Assistant Examiner*—Davis L. Willis
*Attorney*—Holman & Stern ABSTRACT: A method and apparatus for detecting radiation is disclosed, the method and apparatus having particular utility in determining X-ray emission from a surface area such as the screen of a television set. A multiple detector radiation measuring instrument is provided having a plurality of radiation sensors thereon. Novel circuitry is disclosed such that a readout is provided representing the radiation sensor having the highest output, this output signaling the presence of undesired radiation from some location on the screen surface. All except one of the plurality of radiation detectors or sensors are capable of being disabled such that the undesired source of radiation can be localized on the screen surface.

INVENTORS.
RICHARD K. STOMS
EDWARD KUERZE

BY *Jacobi and Davidson*

ATTORNEYS.

INVENTORS.
RICHARD K. STOMS
EDWARD KUERZE
BY Jacobi and Davidson
ATTORNEYS.

METHOD AND APPARATUS FOR MEASURING RADIATION WITH A PLURALITY OF DETECTORS AND DETERMINING SOURCE OF HIGHEST RADIATION EMANATING FROM A SURFACE AREA SUCH AS THE SCREEN OF A COLOR TELEVISION SET

This invention generally concerns radiation detecting and monitoring methods and apparatus and specifically relates to a novel method and apparatus for determining the presence and level of undesired radiation emanating from a surface area, such as the screen of a color television set.

It has been variously estimated that upwards of 15,000,000 families now own color television sets and this number is rapidly increasing each year. Certain color television sets, however, have been found to be insidiously dangerous to the viewer's health since such color television sets may, under some conditions, produce harmful and damaging radiation. Considering the enormous number of color television set owners, a widespread potential health hazard is evident.

Quite naturally, health authorities administrative agencies, and concerned color television set owners have endeavored to determine which color television sets are emanating radiation at levels which may be dangerous to health. To determine the existence of a radiation hazard, a radiation detecting and measuring instrument, suitable for use in the home or field, is required.

Unfortunately presently available radiation detecting and measuring devices have not been found suitable for home and/or field use. Accordingly, there exists a need for a radiation measuring instrument capable of determining dangerous X-ray emission from television sets in the home and/or field, such instrument, although portable, being capable of obtaining rapid and accurate measurements of radiation in a simple manner.

It is a primary object of the subject invention to satisfy this need and to provide a radiation detecting and measuring instrument having the above-described characteristics. A further, though equally important, object of the subject invention is to disclose a novel method of detecting radiation emanating from a surface such as the screen of a color television set, the method enabling accurate and rapid determinations of radiation levels.

These and other objects are implemented by the subject invention which contemplates the provision of a novel method and apparatus for detecting and measuring radiation from the screen of a color television set, for example, the apparatus comprising a unique multiple detector radiation measurement instrument. The instrument comprises a plurality of radiation detector means, such as Geiger-Mueller tubes, each radiation detector means producing an output in response to radiation impinging thereon. Each radiation detector means is preferably connected in parallel arrangement and, through the provision of a novel interconnection circuit means for the plurality of radiation detectors, only the radiation detector having the highest output is operative to effect a readout. In this manner, a large surface can be quickly surveyed to determine harmful radiation levels emanating from the particular area, yet sensitivity of the measuring instrument remains high.

After the presence of a dangerously high radiation level emanating from some area on the surface has been determined, the specific source of the undesired radiation can be localized since the novel apparatus includes provisions for disabling all except one of the radiation detectors or units.

The electrical circuitry preferably utilized in the instrument described above comprises semiconductor elements, such as field-effect transistors so as to reduce cost of manufacture and maintenance as well as the physical size of the instrument Generally, each Geiger-Mueller tube comprising each radiation detector means or unit is provided with a novel integrating circuit comprising a parallel resistor-capacitor branch connected in series with the tube. The charge flowing into the series capacitor is proportional to the amount of radiation impinging on the particular Geiger-Mueller tube and serves to produce a measurable voltage output. Circuit means are provided to automatically select only that voltage output from the plurality of Geiger-Mueller tubes which is higher than all the others, this output being amplified and comprising a signal voltage. An electric meter is coupled between the signal voltage and a reference voltage, the electric meter indicating a level of radiation. Switch means are provided for disabling the voltage supply to all except one of the Geiger-Mueller tubes so that a source of radiation can be localized. Additionally, circuit means are variously provided so as to adjust the sensitivity and time of response of the electric meter to changes in signal voltage.

The invention will be better understood, its details and features becoming clearly evident when reference is given to the following description of a preferred embodiment thereof, such description making reference to the annexed drawings, wherein.

Figure 1:
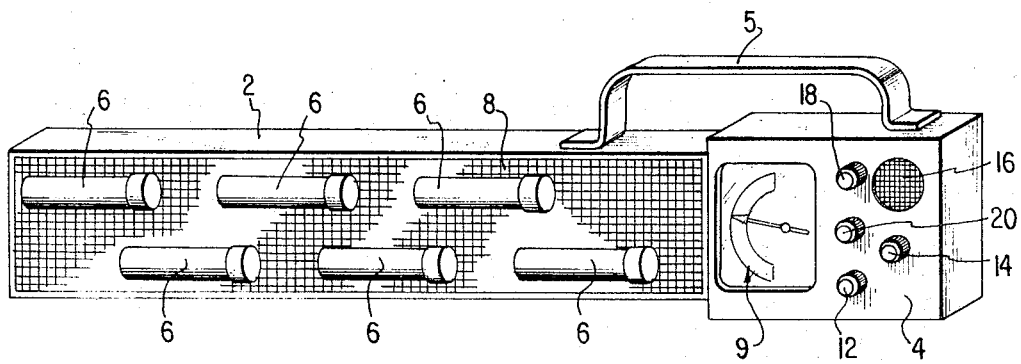
FIG. 1 is a perspective view of a multiple detector radiation measurement instrument constructed in accordance with the subject invention.

Turning now to FIG. 1, a perspective view of a preferred physical embodiment of the subject inventive apparatus is disclosed. The instrument comprises a number of radiation detector elements 6 such as Geiger-Mueller tubes, preferably arranged in two offset parallel rows. The individual detector elements 6 are attached to screening material 8 contained within an elongated, rectangular frame 2. A control box 4 is attached to one end of the frame 2 and contains the necessary electronic circuitry to effect operation in the manner to be described of the multiple radiation detectors 6. A handle 5 is attached to the instrument such that the instrument can be easily carried in home or field use. In a preferred, actual construction of the novel instrument, the dimensions of the same where selected to be 26 inches long, 4½ inches wide and 1½ inches thick. The overall weight of the instrument in actual practice has been found to be less than 4 lbs. reflecting the portable nature of the invention.

The control box 4 is provided with an electric meter 9 which, in the manner to be described below, indicates and is responsive only to the radiation detector 6 of the plurality of radiation detectors contained on the instrument that has the highest output. A plurality of controls are provided on the control box 4 such as a zero control button 12 which serves to set the zero or base level for obtaining meter readings, a time constant selector button or switch 20 which controls the time of response of the electric meter 9 to output signals generated by the radiation detectors 6, a selector switch 14 which serves to select various meter sensitivity ranges and the like, a disabling switch 18 which effects disabling of all except one of the plurality of radiation detectors 6, and an audio speaker 16 which operates in cooperation with the electric meter 9 to provide an audio as well as visual indication of radiation levels detected by the plurality of radiation detectors or Geiger-Mueller tubes 6. Other control switches and the like may be provided, if desired, on the control box 4 and such additional switches as may be provided will become evident as the detailed description of the circuitry contained within the control box 4 is discussed.

Figure 2:
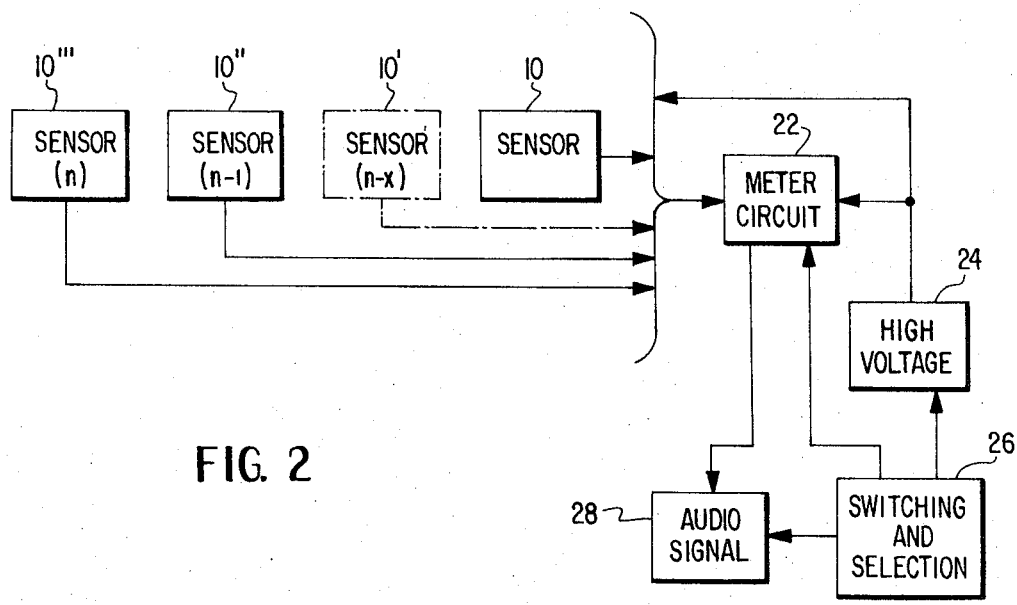
FIG. 2 is a block diagram schematically depicting the general configuration and interconnection of electrical circuits utilized in the novel measurement instrument of the subject invention; and, FIG. 3 is a detailed circuit schematic of the preferred embodiment of the measurement instrument constructed in accordance with the subject invention.

Turning now to FIG. 2, a schematic block diagram depicting the functional electrical operation of the novel inventive radiation detecting and measurement instrument is disclosed. A plurality of sensor units are provided, numeral 10 representing the first sensor unit, 10' representing the $n$th$-x$ sensor unit, 10" representing the $n$th$-1$ sensor unit, and 10''' representing the $n$th sensor unit. Each sensor unit contains a radiation sensing or detecting device such as the Geiger-Mueller tubes 6 depicted in FIG. 1. Although the preferred embodiment of the invention device depicted in FIG. 1 is seen to comprise merely six Geiger-Mueller tubes 6, it should be readily apparent that any number of Geiger-Mueller tubes and any number of sensor units 10 may be provided. Each of the sensor units 10 are supplied from a high voltage power supply 24 and are interconnected together in a manner such that only the sensor unit of the plurality of sensor units that has the highest output generates a signal voltage which is applied to the meter circuit 22 containing the electric meter 9.

The signal voltage applied to the meter circuit 22 is, in effect, compared with a reference voltage generated in the meter circuit and any difference between the signal voltage and the reference voltage effects operation of the electric meter 9 and thus a readout or indication of radiation levels present. A switching and selection circuit containing the selector switch 14 is designated 26 and serves to control the sensitivity of the meter 9 in the meter circuit 22 as well as to provide other checking functions such as causing the meter 9, when the selector switch 14 is in one position, to indicate correct or incorrect operation of the high voltage supply circuit 24. An audio signal circuit 28 can be provided, if desired, and is coupled to the meter circuit 22 such that the signal voltage generated by the sensor unit 10 having the highest output causes an audio signal to be produced. In the preferred embodiment of the invention, the frequency of the audio signal generated is constrained to be proportional to the magnitude of the signal voltage developed by the highest level output sensor unit 10. Alternatively, a threshold device can be provided in the audio signal circuit 28 such that an audio signal is produced only when the signal voltage produced by the sensor units 10 exceeds some predetermined value. Audio speaker 16, of course, is contained within the audio signal circuit 28.

As discussed above, provisions are made in the switching and selection circuit 26 and in the meter circuit 22 such that the high voltage supply 24 to all except one of the sensor units 10 can be disconnected thus disabling all except one of the sensor units 10. This feature of the subject invention is particularly useful in localizing a detected source of radiation emanating from some undetermined location in a surveyed area as will be explained.

In operation, the user of the novel radiation measurement instrument would initially connect the high voltage source 24 to each of the plurality of sensor units 10 thus making each of the sensor units 10 operable to produce an output signal proportional to the amount of radiation impinging on the individual Geiger-Mueller tubes 6 contained therein. The novel instrument would then be placed adjacent a radiating surface such as the screen of a color television set and the instrument would be moved across the entire radiating surface or screen such that the entire radiating surface or screen is initially surveyed. If hazardous radiation is emanating from any point or area on the color television screen, then one of the sensor units 10 would have an output voltage of a higher level than each of the other sensor units 10 which would be merely reading the background radiation. Accordingly, since the interconnection circuitry between the various sensor units 10 is such that only that sensor unit 10 which has the highest output voltage provides a signal voltage to the meter circuit 22, an indication or readout will be effected on the electric meter 9 indicating that, at some location on the color television screen, hazardous radiation levels are present. Naturally, instead of utilizing the electric meter 9 to indicate a readout, it is contemplated that an audio signal may be generated instead. Alternatively, both an audio signal and a visual readout from the electric meter 9 can be effected.

When it has thus been determined that hazardous radiation levels exist at some location on the television screen, then the operator of the novel instrument would disable all except one of the plurality of sensor units 10 by operating the disabling switch 18 which serves to disconnected the high voltage supply 24 from all except one of the sensor units 10. Assuming, now, that only sensor unit 10''' which is the last sensor unit constructed on the instrument is now operable, the user of the novel device would then localize the specific source of the undesired radiation on the radiating surface or color television screen by surveying the radiation surface with the single sensor unit which remains operative. As should be apparent, through utilization of the novel instrument and the general method just discussed, it is possible to quickly survey a large surface area to determine if a hazardous radiation level exists at any point thereon. Only if it has first been determined that a hazardous radiation level is present, is it then necessary to survey the entire radiating surface to localize the specific source of the undesired radiation by using a single sensor unit 10 which, of course, has a much smaller detection area than the cumulative and combined area of the plurality of sensor units 10.

This advantageous increase in survey speed does not, in any manner, affect the sensitivity of the radiation instrument as a whole which might normally be expected. The sensitivity of the instrument, even when utilizing the plurality of detector or sensor units provided, remains the same as would be the case if a single detector or sensor unit were used to tediously survey the entire radiating surface therewith. This highly advantageous and novel operation directly results from the use of a number of radiation sensors connected to appropriate circuitry such that the readout represents the output of the highest reading sensor only.

The theoretical explanation of this novel operational effect can be understood from the following. In a Geiger-Mueller tube rate meter instrument, the meter reading is expressed by the equation $M = kR\, a/A$, wherein: $k$ equals the constant of proportionality expressing sensitivity of an individual radiation detector irradiated over its entire projected area; $R$ equals the exposure rate in MR/hour; $a$ equals the irradiated sensitivity area in square centimeters; $A$ equals the total projected sensitive area in square centimeters.

The selection of a particular Geiger-Mueller tube type serves to fix the values of $k$ and $A$. A particular value $R_f$ of $R$, the exposure rate in MR/hours may be selected to produce a full scale meter reading, $M_f$ for the condition $a = A$, that is for the condition that the irradiated sensitive area in square centimeters equals the total projected sensitive area also in square centimeters. Accordingly, for any value of $a$ below the value of $A$, the meter reading will be $(a/A) \times (M_f)$. The optimum condition, of course, would be $a = A$. However, since, in many cases, $a$ is less than $A$, better meter sensitivity is obtained by utilizing a small value of $A$. For survey purposes, however, in which a large area is to be measured such as the area of a color television screen, a large value of $A$ is necessary. If a number of detectors, however, are connected such that only the detector having the highest output was effective to produce a meter reading, then the smallest practical $A$ equal to the $A$ for a single Geiger-Mueller tube would be achieved and a survey area of $A$ times the number of detectors actually used could still be covered. Accordingly, the primary advantage of the utilization of multiple detectors in this manner is to effect an increased meter sensitivity for a given total area of detector used. Furthermore, the effect of background radiation is reduced for those cases where the irradiated area is less than the total detector area.

Figure 3:
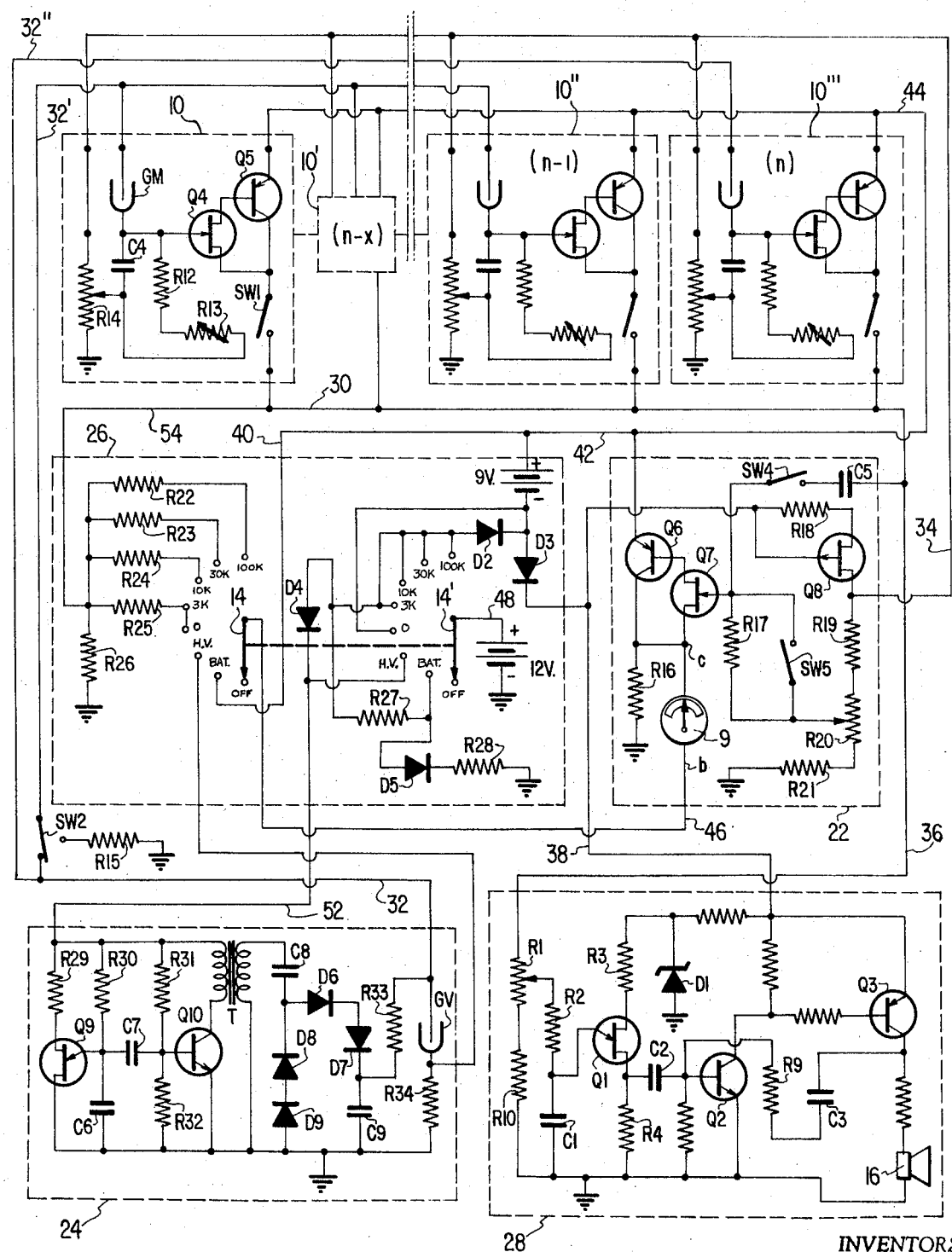

With the above general description of the subject invention and the theoretical explanation thereof now firmly in mind, attention is directed to FIG. 3 wherein a detailed electrical circuit schematic of a preferred embodiment of the subject invention is depicted. The plurality of sensor units utilized are depicted in the dotted line areas 10, 10', 10''', etc. The electric meter circuit 22, the high voltage circuit 24, the switching and selection circuit 26, and the audio signal circuit 28 are likewise depicted in dotted line blocks. As is apparent, the detailed circuit schematic of FIG. 3 corresponds to the functional block diagram in FIG. 2 and the operation of the detailed circuit is as generally described above.

SENSOR UNITS

A plurality of sensor units 10 are provided to detect radiation emanating from a surface such as the screen of a color television set. The first sensor unit is designated 10, whereas the last or "nth" sensor unit is designated 10'''. Each sensor unit is preferably identically constructed so that a description of the components utilized in sensor unit 10 or the first sensor unit will suffice for an understanding of all the sensor units.

The heart of a sensor unit 10 comprises a radiation detector element such as Geiger-Mueller tube GM which, in the preferred embodiment of the invention comprises a 1B85 Geiger-Mueller tube. One terminal of the Geiger-Mueller tube GM is connected to an integration circuit comprising a series capacitor C4 shunted by two calibration resistors R12 and R13, the resistors being connected in series. Resistor R13 is preferably a variable resistor such that calibration can be adjusted. The other terminal of the Geiger-Mueller tube GM is coupled to a source of high voltage via line 32', through switch SW2, to line 32 leading to the high voltage supply circuit 24.

The Geiger-Mueller tube GM in combination with the unique integration circuit therefor comprising a parallel combination of capacitor C4 and resistors R12 and R13 coupled in series with the Geiger-Mueller tube GM operates in a highly advantageous fashion. Normally, a Geiger-Mueller tube is provided in series circuit with a resistive element across a source of supply. When an ionizing event occurs in the active volume of a Geiger-Mueller tube, that is when the Geiger-Mueller tube is subjected to radiation, a voltage pulse would be produced across the series resistor. A complex counting circuit coupled to the series resistor would thus be necessary to count the number of voltage pulses produced which would be proportional to the number of ionizing events occurring in the Geiger-Mueller tube and thus proportional to the level of radiation impinging thereon. However, with the novel integration circuit of the subject invention, every time an ionizing event occurs in the active volume of the Geiger-Mueller tube GM, a charge is caused to be stored on the integrating capacitor C4. The addition of the shunt resistors R12 and R13 across the integrating capacitor C4 serves to alter the integrating time of the circuit such that a decreasing amount of charge would be stored on the capacitor for each ionizing event occurring in the active volume of the Geiger-Mueller tube GM as the value of the resistor R12 and R13 increases. The end result is that the voltage developed across the capacitor C4 shunted by resistors R12 and R13 is related to the number of discharges or ionizing events occurring in the Geiger-Mueller tube. This output voltage can then be measured to determine the radiation level of interest. This technique has the further advantage that the fall-off in output voltage at high count rates is due to the Geiger-Mueller tube characteristics only rather than being due to the Geiger-Mueller tube characteristics and the count or count rate circuit characteristics in the previously used counting circuit methods.

In the preferred and disclosed circuit of the subject invention, a field-effect transistor volt meter circuit comprising field-effect transistor Q4 and PNP transistor Q5 is utilized to measure and amplify the voltage across the capacitor C4. The emitter of transistor Q5 is coupled with a 21-volt supply voltage when in normal operation via conductor 44 leading to conductor 42 entering the switch circuit 26. The collector of transistor Q5 is coupled through switch SW1 via conductor 30 and conductor 54 through resistor R26, also in the switch circuit 26 and then to ground. The gate of the field-effect transistor Q4 is coupled to the junction of capacitor C4 and resistor R12, whereas the output electrodes of transistor Q4 are respectively coupled to the base of transistor Q5 and to the collector electrode of transistor Q5. Field-effect transistor Q4 and transistor Q5 as well as resistor R26 in the output circuit of transistor Q5 effectively comprise a "source follower" circuit since the voltage produced on line or conductor 30 in the output path of transistor Q5 will substantially follow the voltage applied to the gate of field-effect transistor Q4.

A variable resistor R14 is provided in each sensor unit 10 coupled between ground and a stable reference voltage generated in the meter circuit 22 via conductor 34. The junction between capacitor C4 and resistor R13 is variably tapped into resistor R14 and the resistor is utilized to equalize the steady state zero signal voltage on conductor 30.

The sensor unit circuit as described is operative in a manner such that ionizing events occurring in Geiger-Mueller tube GM causes an electrical charge to be collected in capacitor C4 and a voltage to be produced thereacross. The voltage across capacitor C4 is applied to the gate of field-effect transistor Q4, and, since field-effect transistor Q4 and transistor Q5 effect a "source follower" circuit, the voltage applied or present on conductor 30 thus would be proportional to the voltage across capacitor C4 and thus indicative of the number of ionizing events occurring in the Geiger-Mueller tube GM and thus the radiation level impinging thereon.

It is to be noted that the output circuit of transistor Q5 in each of the plurality of sensor units 10 are coupled together via the interconnection line 30. Effectively, then, each of the plurality of identical sensor units can be considered to be coupled in parallel circuit arrangement with one another. This novel interconnection and circuitry effects a novel operational feature of the subject invention since the voltage level present on conductor 30 will be indicative of the output signal of that sensor unit whose output signal is greater than each of the other sensor units comprising the plurality. This operation occurs because an increase in voltage on line 30 due to an increase in the gate voltage applied to field-effect transistor Q4 in any one of the sensor units 10 will tend to cutoff current flow through the remaining transistors Q4 and Q5 in each of the other sensor units having a lower level output. Accordingly, the voltage developed on conductor 30 is indicative of the output of that sensor unit having the highest output and such voltage will be referred to as the signal voltage hereinbelow. Switch SW1 is provided in the output circuit path of transistor Q5 on each of the sensor units such that each unit can be made independent of the other units and be set to zero individually when desired.

METER CIRCUIT

Meter circuit 22 comprises, as its major components, a constant current generator circuit configuration and the electric meter 9 which, as described above, produces a visual output representative of the output voltage of that sensor unit of the plurality of sensor units that produces the highest output.

Transistor Q8 serves as the main element comprising the constant current generator and includes an output circuit comprising resistors R18 through R21 which coupled the output of transistor Q8 between ground and a 12-volt source of supply through diodes D2 and D3 in the switching and selection circuit 26. The gate electrode of transistor Q8 is likewise connected to the source of supply. A conductor 34 is tapped across resistors R19 through R21 in the output circuit of transistor Q8 and supplies a constant reference voltage to the resistors R14 contained in each sensor unit 10 as discussed above.

A further "source follower" circuit configuration is provided by field-effect transistor Q7 and transistor Q6, the latter having an output circuit coupled across the source of supply via a conductor 42 and to ground through resistor R16. The gate electrode of field-effect transistor Q7 is supplied with a voltage through resistor R17 variably tapped into resistor R20 contained in the output circuit path of transistor Q8. The electric meter 9 is coupled between the junction of resistor R16 with the collector electrode of transistor Q6 and to a selector switch 14 in the switching circuit 26 via a conductor 46. Through operation of selector switch 14 in the switching and selection circuit 26, and particularly when the selector switch 14 is actuated to contact various ones of the resistors R22 through R25 therein, a voltage will be developed on conductor 46 and thus at point b leading to one side of the electric meter 9 which is related to the signal voltage output from the sensor unit 10 applied on conductor 30.

As is apparent, if the voltages at point $b$ and $c$, that is the voltage difference across the meter 9 is unbalanced, then meter 9 will be actuated and a reading can be taken. Naturally, if voltages at point $b$ and $c$ vary equal amounts in the same direction, then there will be no meter deflection. If the gate of field-effect transistor Q7 were made to follow the voltage changes occurring at point $b$ and thus occurring on conductor 30, then point $c$ would also follow these changes and the meter reading would not change. Normally, however, point $c$ is supplied with a constant reference potential and thus any change in voltage on conductor 30 and thus at point $b$ would produce a new meter deflection.

However, it is to be noted that a time constant capacitor C5 is connected between the gate of transistor Q7 and conductor 30 through switch SW4. This time constant capacitor C5 in conjunction with the resistor R17 determines a meter time constant. The capacitor will allow relatively fast changes in signal voltage on conductor 30 to couple to the gate of transistor Q7 such that fast changing levels of signal voltage on conductor 30 will not alter a meter reading on electric meter 9. However, slow changes in the signal voltage on conductor 30 will not be coupled to the base of field-effect transistor Q7. In this latter case, point $c$ would thus have a constant reference potential thereat and the slow changes in signal voltage on conductor 30 would be reflected to point $b$ at the meter 9 and cause a change of the meter deflection. It has been found to be convenient when utilizing an instrument having an appreciable time constant to be able to occasionally revert to a quick response for a short period of time to thus allow the electric meter to assume its approximate reading and then return the instrument to its longer time constant mode of operation. This can be done in the subject invention by merely depressing a pushbutton switch SW5 which serves to short resistor R17 to thus reduce the time constant of response. It is to be noted, however, that an additional and inherent "base" time constant for the inventive measuring apparatus is provided by resistors R12 and R13 across capacitor C4 in the individual sensor units 10.

SWITCHING AND SELECTION CIRCUITS

The switching and selection circuits comprise two ganged selector switches 14 and 14' having a plurality of different switching positions. By switching the selector switches 14 and 14', various values of resistance R22 through R25 can be placed in circuit between conductor 30 upon which the signal voltage from the sensor unit 10 is provided and point $b$ of the electric meter circuit 22. Specifically, values of resistance are provided in the 3K, 10K, 30K and 100K ranges which merely serve to adjust the amount of signal needed at point $b$ in the meter circuit 22 necessary to effect full scale meter deflection of the electric meter 9.

Each of the selector switches 14 and 14' are shown in the circuit schematic as being in the "off" position wherein the power supply comprising the 9-volt battery and the 12-volt battery contained within the switching and selection circuits 26 is disconnected from the instrument. When the selector switches 14 and 14' are switched into the BAT. position, the electric meter 9 will be caused to read battery voltage under normal load. When the selector switches 14 and 14' are switched into the H.V. position, the operation of the high voltage supply circuit 24 can be monitored. In this particular mode of operation, the current running through the electric meter 9 will be a portion of the output current of the high voltage circuit 24 tapped across resistor R34 therein and applied to conductor 46 and point $b$ of the electric meter circuit 22. Additionally, when selector switch 14' is in the H.V. position, the 12-volt source of supply is coupled through conductor 48 and the selector switch 14' via conductor 52 to provide a supply voltage for the high voltage circuit 24. Any "on scale" reading on the electric meter 9 when the selector switches 14 and 14' are in the H.V. position, indicates that the high voltage supply is on and operating and regulating properly. When the selector switches 14 and 14' are in the H.V. position, all other circuits other than the high voltage supply circuit 24 are disconnected. By the positioning of diode D4 in the switching and selection circuit 26, the battery voltage from the 12-volt source of supply is blocked and thus no voltage will be produced at point $c$ in the electric meter circuit 22 to obscure the meter reading.

When switches 14 and 14' are placed into the "zero" position, the high voltage power supply 24 is disabled and the various sensor units 10 can be adjusted such that a zero reading on the electric meter 9 is obtained.

HIGH VOLTAGE SUPPLY CIRCUIT

The high voltage supply circuit 24 in general terms, comprises an electronic oscillator circuit, the output of which is amplified and rectified so as to produce a high DC voltage on the order of 900 volts or more. A unijunction transistor Q9 is appropriately biased by resistor R29 across a source of supply via conductor 52 and ground. Transistor Q9 preferably comprises a unijunction transistor and is operated as a relaxation oscillator. Specifically, a ramp voltage is generated at the emitter of transistor Q9 by continual charging and discharging of capacitor C6 through resistor R30, this ramp voltage being capacitively coupled through capacitor C7 to the base electrode of a normally nonconductive transistor Q10. The base of transistor Q10 is appropriately biased via resistors R31 and R32 as shown. A series of square wave current pulses will be produced in the output circuit of transistor Q10 and thus through the primary winding of a transformer T connected therein. The frequency of the pulses of square wave current may be 2 kilocycles or more.

The square wave current pulses through the primary of transformer T is stepped up in the secondary of the transformer T through a standard voltage doubler circuit comprising capacitor C8 and diodes D6 through D9. A shunt regulator generally designated GV is supplied through resistor R33 and a series resistor R34. As explained above, when the selector switches 14 and 14' are in the H.V. position, a portion of the current flowing through the shunt regulator GV through resistor R34 will be reflected as a meter reading in the electric meter 9.

The output from the high voltage circuit 24 is provided on conductor 32 which branches into two further conductors, i.e., 32' and 32". Conductor 32' supplies the high voltage necessary to operate the Geiger-Mueller tubes in each of the sensor units except the last or $n$th sensor unit 10'''. The high voltage supply necessary to operate the Geiger-Mueller tube in the last or $n$th sensor unit 10''' is supplied by conductor 32". When switch SW2 is in the position depicted, all sensor units 10 will be operable as a high voltage supply will be provided to the Geiger-Mueller tubes therein. However, when switch SW2 is placed into the alternative position, that is into contact with resistor R15, the high voltage supply to each of the sensor units 10 except the last or $n$th sensor unit 10''' will be cutoff and, in fact, the capacitor C4 and Geiger-Mueller tubes GM in the various cutoff sensor units 10 will be allowed to discharge through the resistor R15. As discussed above, disabling all except one of the sensor units is utilized to "localize" a source of radiation indicated to be somewhere on the survey surface through operation of all of the sensor units.

AUDIO SIGNAL CIRCUIT

An audio signal circuit generally designated 28 is provided such that an audio signal can be produced for a preselected X-ray level detected by the sensor units 10. A potentiometer R1 is coupled via resistor R10 to ground and via conductor 36 to conductor 30 upon which, as stated above, the signal voltage from the sensor 10 having the highest output voltage level is provided. The voltage across potentiometer resistor R1 is tapped through resistor R2 and impressed upon capacitor C1.

The junction between capacitor C1 and resistor R2 is coupled to the base electrode of a unijunction transistor Q1. Thus, the voltage impressed at the base electrode of unijunction transistor Q1 is related to the amount of radiation exposure to which the sensor units 10 are subjected. Resistor R3 in the output circuit of unijunction transistor Q1 is selected such that the maximum possible setting of potentiometer R1 will just barely keep unijunction transistor Q1 from firing and thus causing oscillations when the zero signal voltage level on conductor 30 is present. Any increase in voltage on conductor 30 indicating an actual output from the sensor units 10 will cause the base voltage at transistor Q1 to increase and thus cause oscillation in the output circuit thereof. The frequency of oscillation is a function of the supply voltage level applied to the base of unijunction transistor Q1. Accordingly, a greater frequency is produced as the amount of radiation exposure detected by the sensor units 10 increases.

Each time that unijunction transistor Q1 fires, a positive pulse across resistor R4 is coupled via capacitor C2 to the base electrode of transistor Q2. Transistors Q2 and Q3 comprise a monostable multivibrator and, in the normal state, both transistors Q2 and Q3 are nonconductive. Each positive pulse from unijunction transistor Q1 will serve to cause both transistors Q2 and Q3 to conduct. Speaker 16 is provided in the output circuit of transistor Q3 and, through the operation of the monostable multivibrator comprising transistors Q2 and Q3, receives a pulse of energy for every pulse produced by unijunction transistor Q1. A feedback network consisting of resistor R9 and capacitor C3 provides a positive feedback required for monostable multivibrator action and serves to control the "on" time of the multivibrator. A Zener diode D1 is coupled across the output path of unijunction transistor Q1 to stabilize the voltage delivered on conductor 38 coupled to the source of supply container within the selection and switching circuit 26. Accordingly, in addition to a visual indication of the radiation detected by that sensor unit 10 having the highest output, such visual indication being given by the electric meter 9, an audio signal having an increasing frequency as the radiation level increases, is also provided. This audible signal can be utilized at the discretion of the operator of the instrument and may be turned off, if desired, by merely turning the audio control comprising the potentiometer R1 to a level such that unijunction transistor Q1 will not respond. Furthermore, by suitable adjustment of the potentiometer R1, an audio signal can be produced only when the radiation detected by the sensor units 10 exceeds a certain predetermined selected value, such value conceivably being that at which a clear danger to health is present.

As should now be apparent, the objects initially set forth at the outset of this specification have been successfully achieved.

We claim:

1. A radiation measurement instrument comprising:
    a plurality of radiation detector means;
    each radiation detector means producing an output in response to radiation impinging thereon; and
    readout means responsive only to the radiation detector means of said plurality of radiation detector means having the highest output, whereby the outputs of the other radiation detector means of said plurality are effectively disconnected from said readout means.

2. A radiation measurement instrument as defined in claim 1, further including means to disable all except one of said plurality of radiation detector means.

3. A radiation measurement instrument as defined in claim 2, wherein said radiation detector means comprises Geiger-Mueller tubes and wherein said readout means comprises a meter including electrical circuit means therefor.

4. A radiation sensor unit comprising:
    power supply means;
    a Geiger-Mueller tube;
    circuit means including a series capacitor for connecting said Geiger-Mueller tube to said power supply means;
    shunt resistor means placed in parallel circuit arrangement across said series capacitor; and
    voltage amplifying means coupled to said series capacitor and shunt resistor means whereby the output of the Geiger-Mueller tube is integrated by the capacitor and read as a voltage value, said voltage amplifying means comprising a field-effect transistor having an input gate coupled to said capacitor and two output electrodes; a transistor having a base electrode and an output circuit path; means connecting one of said output electrodes of said field-effect transistor to said base electrode of said transistor; and means connecting the other of said output electrodes of said field-effect transistor to said output circuit path of said transistor.

5. A radiation measuring instrument comprising:
    a plurality of radiation sensing unit means, each radiation sensing unit means producing an output in response to radiation impinging thereon;
    interconnection circuit means for interconnecting said plurality of radiation sensing unit means, said circuit means selecting the radiation sensing unit means having the highest output and producing a signal voltage in response thereto;
    Current generator means for producing a reference voltage;
    an electric meter; and
    means for coupling said electric meter with said interconnection circuit means and said current generator means such that said electric meter gives a reading upon an unbalance of said signal voltage with said reference voltage whereby the outputs of the other radiation sensing unit means of said plurality are effectively disconnected from said circuit means.

6. A radiation measuring instrument as defined in claim 5, further including electrical means for adjusting the effective sensitivity of said electric meter.

7. A radiation measuring instrument as defined in claim 6, further including a high voltage supply means connected to each of said plurality of radiation sensing unit means, and switch means for disconnecting said high voltage supply means from all except one of said plurality of radiation sensing unit means.

8. A radiation measuring instrument as defined in claim 7, further including audio alarm means coupled with said interconnection circuit means, said audio alarm means producing an audio signal in response to said signal voltage, the frequency of said audio signal being proportional to the level of said signal voltage.

9. A radiation measuring instrument as defined in claim 7, further including electrical means for adjusting the time rate of response of said electric meter to changes in said signal voltage.

10. A radiation measuring instrument as defined in claim 9, wherein each said radiation sensing unit means comprises a Geiger-Mueller tube; circuit means including a series capacitor for connecting said Geiger-Mueller tube across said high voltage supply means; shunt resistor means placed in parallel circuit arrangement across said series capacitor; and voltage amplifying means coupled to said series capacitor.

11. A method of detecting and measuring undesired radiation emanating from a surface, such as the surface of a television screen, said method comprising the steps of:
    providing a number of radiation detectors;
    placing the radiation detectors adjacent the radiating surface and moving the radiation detectors across the radiating surface such that the entire radiating surface is surveyed;
    detecting the presence of undesired radiation from the surface by monitoring the radiation detector having the highest output; and
    localizing the specific source of the undesired radiation on the radiating surface by surveying the radiating surface with a single one of the plurality of radiation detectors.